United States Patent
Sung et al.

(10) Patent No.: US 10,291,541 B1
(45) Date of Patent: May 14, 2019

(54) SYSTEMS AND METHODS FOR SCHEDULING TRANSMISSIONS FROM AN ACCESS NODE

(71) Applicant: Sprint Spectrum LP, Overland Park, KS (US)

(72) Inventors: Sanghoon Sung, Ashburn, VA (US); Tri Duong, Annandale, VA (US); Udit Thakore, Fairfax, VA (US); Yu Wang, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 442 days.

(21) Appl. No.: 14/801,044

(22) Filed: Jul. 16, 2015

(51) Int. Cl.
- *H04W 72/12* (2009.01)
- *H04L 12/925* (2013.01)
- *H04L 12/823* (2013.01)

(52) U.S. Cl.
CPC .......... *H04L 47/722* (2013.01); *H04L 47/32* (2013.01); *H04W 72/1231* (2013.01); *H04W 72/1236* (2013.01)

(58) Field of Classification Search
CPC .. H04L 47/722; H04L 47/32; H04W 72/1236; H04W 72/1231
See application file for complete search history.

(56) References Cited

U.S. PATENT DOCUMENTS

| | | | |
|---|---|---|---|
| 8,312,339 B2 | 11/2012 | Roy et al. | |
| 8,522,107 B2 | 8/2013 | Chandra et al. | |
| 8,917,728 B2 | 12/2014 | Umesh et al. | |
| 2004/0081248 A1* | 4/2004 | Parolari | H04L 1/0003 375/259 |
| 2005/0076283 A1* | 4/2005 | Malkamaki | H04L 1/1819 714/748 |
| 2006/0165091 A1* | 7/2006 | Arima | H04B 7/26 370/395.21 |
| 2011/0026408 A1* | 2/2011 | Skarve | H04L 1/1812 370/242 |
| 2015/0250001 A1* | 9/2015 | Tan | H04L 47/2408 370/329 |

* cited by examiner

*Primary Examiner* — Xavier Szewai Wong (57) ABSTRACT

Systems and methods are described for scheduling transmissions from an access node in a communication network. A plurality of data packets may be received at a buffer of an access node. A discard timer may be started on receipt of the data packets. When the discard packet timer expires, a number of data packets in the buffer and an associated aggregated queuing delay may be determined. The aggregated queuing delay may be compared to target block error rate (BLER). The target BLER may be modified when the aggregated queuing delay and the number of data packets exceed a target threshold. Data packets may be transmitted from the access node using the modified BLER.

17 Claims, 6 Drawing Sheets

SYSTEMS AND METHODS FOR SCHEDULING TRANSMISSIONS FROM AN ACCESS NODE

TECHNICAL BACKGROUND

Telecommunication systems, such as cellular networks or other wireless networks, use various network links throughout the network to communicate. For example, an access node may use a network link to coordinate packet transmissions of data with another access node while using a separate network link to communicate with another processing node or wireless device. Accordingly, the system may rely on a well-established communication network to provide efficient communication services.

In certain circumstances, a portion of the network may experience high load (e.g., loading above a threshold) or poor channel conditions. For example, a communication link may experience interference conditions that stem from large amounts of data traffic or poor channel conditions. These interference conditions may render a communication link less effective, and the efficiency of the system may suffer. Accordingly, a scheduler that effectively balances load and considers channel conditions may be able to provide a high quality service to users of the system.

Overview

Systems and methods are described for scheduling transmissions from an access node in a communication network. In one instance, a plurality of data packets may be received at a buffer of an access node. A discard timer may be started on receipt of the data packets. When the discard packet timer expires, a number of data packets in the buffer and an associated aggregated queuing delay may be determined. The aggregated queuing delay may be compared to a target block error rate (BLER). The target BLER may be modified when the aggregated queuing delay and the number of data packets exceed a target threshold. Data packets may be transmitted from the access node using the modified target BLER.

DETAILED DESCRIPTION

Figure 1:
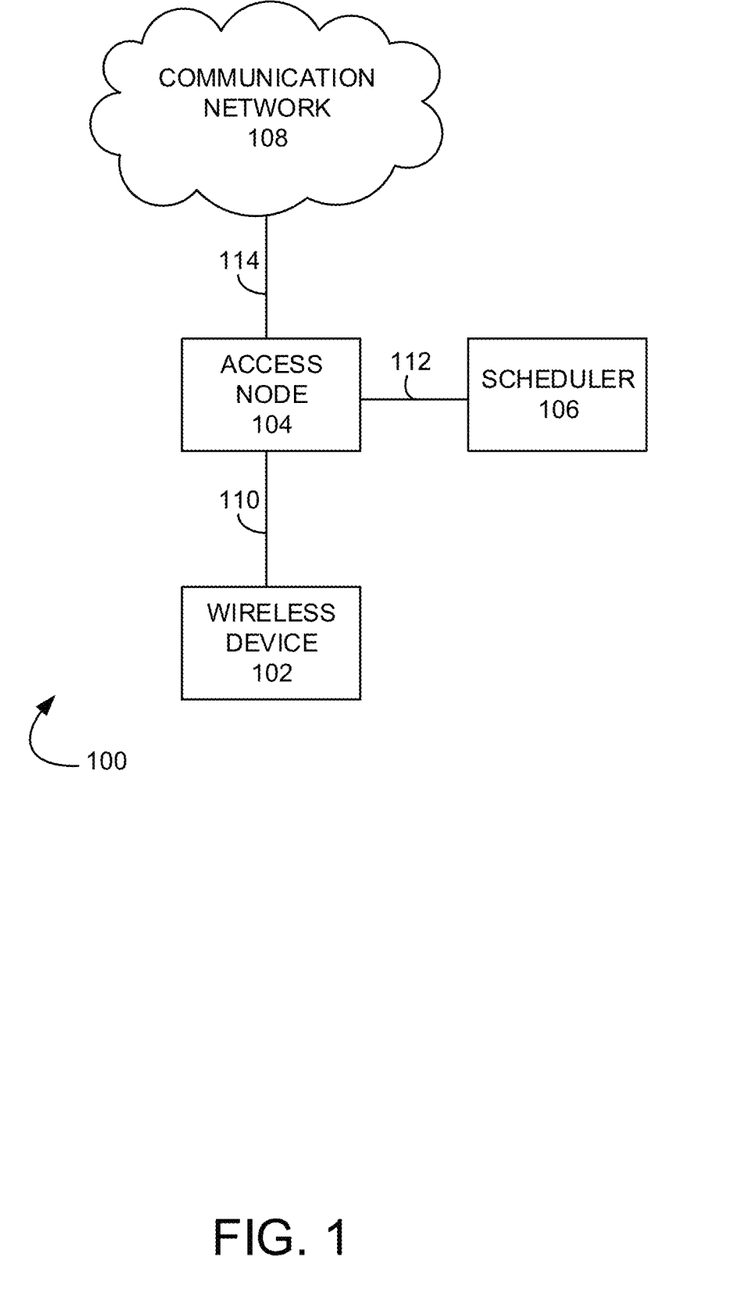
FIG. 1 illustrates an exemplary communication system for scheduling transmissions from an access node in a wireless communication network.

FIG. 1 illustrates an exemplary communication system 100 for scheduling transmissions from an access node in a wireless communication network. In operation, a queuing delay at scheduler node 106 and/or congestion at a packet buffer of access node 104 may occur due to, for example, data transmission errors (e.g., noise, interference, and/or fading) and/or packet loss. In an exemplary embodiment, data packets related to applications running on wireless device 102 can be uploaded to and downloaded from system 100 on respective UL and DL portions of communication links 110, 112, 114 via sub-layers of a user-plane protocol stack of system 100. For example, the data packets can be received at a Packet Data Compression Protocol (PDCP) layer of system 100. From the PDCP layer, the data packets are passed to a Radio Link Control (RLC) layer to be concatenated or segmented into a correct block size. The RLC layer forwards the concatenated data packets to the Media Access Control (MAC) layer for transmission by a Physical (PHY) layer of the user-plane protocol stack via access node 104 and/or scheduler node 106 based on a selected modulation and coding scheme (MCS).

In some instances, for example, due to data transmission errors (e.g., noise, interference, and/or fading) and/or packet loss, the transmitted data packets can be subject to Hybrid Automatic Repeat Request (HARQ/ARQ) re-transmissions at the MAC sub-layer and/or the RLC layer of the user-plane protocol stack for error recovery. When HARQ/ARQ is working frequency for error recovery, a Round Trip Time (RTT) for the data packets, e.g., Transmission Control Protocol (TCP) RTT, increases and affects TCP throughput of system 100. This is, in part, because TCP throughput is inversely proportional to the RTT of the data packets.

Increased HARQ/ARQ re-transmissions results in queuing delay at access node 104 and/or scheduler node 106 due to increased signaling overhead and/or a bearer data load on, for example, the DL portion of communication links 110, 112, 114. In addition, HARQ/ARQ re-transmissions can increase congestion at the packet buffer (not shown) or cause bottle-neck at the PHY layer of system 100. Thus, systems and methods for decreasing queuing delay at scheduler node 106 and/or congestion at the packet buffer (not shown) of access node 104 while maintaining a high bearer/link utilization rate is desirable. For example, it is desirable to determine an aggregated queuing delay associated with scheduler node 106 and an associated "back log" of data packets in the packet buffer and adapt, for example, the selected MCS to tune a target Block Error Rate (BLER) to account for network congestion and/or data load on communication links 110, 112, 114 of system 100.

Communication system 100 can comprise wireless device 102, access node 104, scheduler 106, and communication network 108. Other network elements may be present in the communication system 100 to facilitate communication, but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104 and communication network 108, which are omitted for clarity, including additional processing nodes, routers, gateways, and physical and/or wireless data links for carrying data among the various network elements.

Wireless device 102 can be any device configured to communicate over system 100 using a wireless interface. For example, wireless device 102 can include can include a remote terminal unit, a cell phone, a smart phone, a computing platform such as a laptop, palmtop, or a tablet, a personal digital assistant, or an internet access device, and combinations thereof. It is noted that while one wireless device 102 is illustrated in FIG. 1 as being in communication with access node 104, any number of wireless devices can be implemented according to various exemplary embodiments disclosed herein.

Access node 104 can be any network node capable of providing wireless communications to wireless device 102, and can be, for example, a base transceiver station, a radio base station, a NodeB device, or an enhanced eNodeB device. Access node 104 can include a scheduler module, illustrated in FIGS. 2A and 2B, or can be in communication with scheduler node 106 through communication link 112. Access node 104 may utilize the scheduler module and/or scheduler node 106 to coordinate transmissions of wireless resources (e.g., the next available physical resource blocks, wireless spectrum, etc.) among connected wireless devices, for example, wireless device 102. The scheduler module and/or scheduler node 106 can collect and store capacity and transmission delay characteristics (e.g., buffered data, signal quality, throughput, guaranteed bit rate/non-guaranteed bit rate, busy hour, backhaul limitations/capacity, mobility, available spectrum, etc.) reported by wireless device 102 at access node 104. Access node 104 via the scheduler module or scheduler node 106 can distribute the wireless resources via a scheduling algorithm to wireless device 102 based on the collected characteristics.

Although only one access node 104 is illustrated in FIG. 1, wireless device 102 can be in communication with a plurality of access nodes and/or relay nodes. The plurality of access nodes and/or relay nodes can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a Local-Area Network (LAN), a Wide-Area Network (WAN), and an internetwork (including the Internet). Communication network 108 can be capable of carrying data, for example, to support voice, push-to-talk, broadcast video, and data communications by a wireless device, such as, for example, wireless device 102. Wireless network protocols may comprise Code Division Multiple Access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise additional base stations, controller nodes, telephony switches, internet routers, network gateways, computer systems, communication links, or some other type of communication equipment, and combinations thereof.

Communication links 110, 112, 114 can be wired or wireless communication links and use various communication protocols such as Internet, Internet Protocol (IP), Local-Area Network (LAN), optical networking, Hybrid Fiber Coax (HFC), telephony, T1, or some other communication format—including combinations, improvements, or variations thereof. Wireless communication links 110, 112, 114 can comprise, for example, radio frequency, microwave, infrared, or other similar signal, and can use a suitable communication protocol, for example, GSM, CDMA, UMTS, HSPA, EV-DO, EV-DO rev. A, 3GPP LTE, or WiMAX, or combinations thereof. Communication links 110, 112, 114 can be a direct link or might include various equipment, intermediate components, systems, and networks.

Wireless communication links 110, 112, 114 can comprise one or more logical channels, one or more transport channels, and one or more physical channels. A logical channel typically describes different flows of information, such as bearer data and/or signaling information, and can be organized differently for uplink (UL) and downlink (DL) portions of a communication link, such as, for example, communication links 110, 112, 114. A transport channel can organize information, such as data packets, received from one or more logical channels for transmission over a communication link, and can define how and with what type of characteristics information is transferred by the physical channel. A physical channel can comprise, for example, a carrier frequency or a number of carrier frequencies in a communication link, and can provide a physical transmission medium for one or more transport channels.

Figures 2A, 2B:
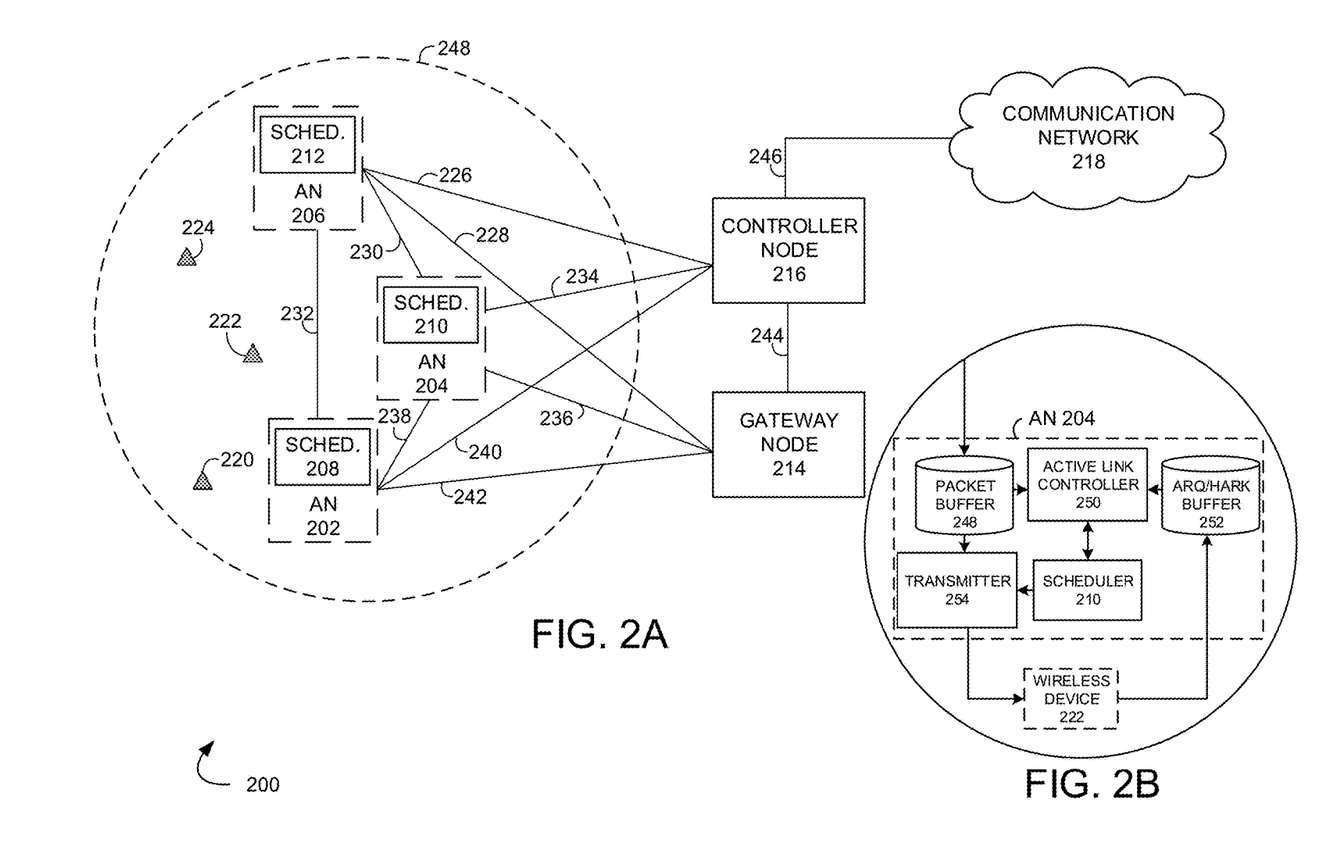
FIG. 2A illustrates another exemplary system for scheduling transmissions from an access node in a wireless communication network.
FIG. 2B illustrates a portion of the exemplary system for scheduling transmissions from an access node in a wireless communication network illustrated in FIG. 2A.

FIG. 2A illustrates an exemplary communication system 200 for scheduling transmissions from an access node in a wireless communication network. FIG. 2B illustrates a portion of the exemplary system 200 illustrated in FIG. 2A for scheduling transmissions from an access node in a wireless communication network. Communication system 200 can comprise wireless devices 220, 222, 224, access nodes 202, 204, 206, schedulers 208, 210, 212, gateway node 214, controller node 216, and communication network 218. Other network elements may be present in communication system 200 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 202, 204, 206 and communication network 218, which are omitted for clarity, including additional processing nodes, routers, gateways, and physical and/or wireless data links for carrying data among the various network elements.

Wireless devices 220, 222, 224 can be any device configured to communicate over system 200 using a wireless interface. For example, wireless devices 220, 222, 224 can include a remote terminal unit, a cell phone, a smart phone, a computing platform such as a laptop, palmtop, or a tablet, a personal digital assistant, or an internet access device, and combinations thereof. It is noted that while three wireless devices are illustrated in FIG. 2A as being in communication with access nodes 202, 204, 206, any number of wireless devices can be implemented according to various exemplary embodiments disclosed herein.

The wireless interface of wireless devices 220, 222, 224 can include, for example, one or more transceivers for transmitting and receiving data over communication system 200. Each transceiver can be associated with the same or different frequency bands, the same or different radio access technologies, the same or different network providers, and/or the same or different services. For example, wireless devices 220, 222, 224 can include a transceiver that is associated with one or more of the following: CDMA, GSM, WiMAX, LTE, and/or HSDPA, IEEE 802.11, Wi-Fi, Bluetooth, Zigbee, IrDA, MBMS, etc.

While not illustrated in FIG. 2A for clarity, wireless devices 220, 222, 224 can be in communication with access nodes 202, 204, 206 through communication links. The communication links can use various communication media, such as air, space, metal, optical fiber, or some other signal propagation path—including combinations thereof. The communication links may comprise many different signals sharing the same link. The communication links could include, for example, multiple signals operating in a single "air path" comprising beacon signals, user communications, communication sessions, overhead communications, frequencies, timeslots, transportation ports, logical transportation links, network sockets, packets, or communication directions. For example, user communication between wireless device 222 and access node 204 could share the same representative wireless link, but be transferred over different communication sessions, frequencies, timeslots, packets, ports, sockets, logical transport links, or in different directions, including combinations thereof.

Wireless devices 220, 222, 224 can transmit and/or receive information over communication system 200 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, news alerts, etc.

Access nodes 202, 204, 206 can be any network node capable of providing wireless communications to wireless devices 220, 222, 224 and can be, for example, a base transceiver station, a radio base station, a NodeB device, or an enhanced eNodeB device. Access nodes 202, 204, 206 can include a scheduler module 208, 210, 212 or can be in communication with a scheduler node, illustrated in FIG. 1. Access nodes 202, 204, 206 may utilize the scheduler modules 208, 210, 212 and/or a scheduler node to coordinate transmissions of wireless resources (e.g., the next available physical resource blocks, wireless spectrum, etc.) among connected wireless devices, for example, wireless devices 220, 222, 224. The scheduler modules 208, 210, 212 and/or scheduler node can collect and store capacity and transmission delay characteristics (e.g., buffered data, signal quality, throughput, guaranteed bit rate/non-guaranteed bit rate, busy hour, backhaul limitations/capacity, mobility, available spectrum, etc.) reported by wireless devices 220, 222, 224 at access nodes 202, 204, 206. Access nodes 202, 204, 206 via the scheduler modules 208, 210, 212 and/or scheduler node can distribute the wireless resources (e.g., the next available physical resources blocks, wireless spectrum, etc.) via a scheduling algorithm to wireless devices 220, 222, 224 based on the collected characteristics.

Access nodes 202, 204, 206 can comprise a processor and associated circuitry to execute or direct the execution of computer-readable instructions to obtain information. Access nodes 202, 204, 206 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 202, 204, 206 can receive instructions and other input at a user interface.

Gateway node 214 can be any network node configured to interface with other network nodes using various protocols that communicate, route, and forward communication data addressed to wireless devices 220, 222, 224. In addition, gateway node 214 can act as a mobility anchor for wireless devices 220, 222, 224 during handovers between different frequencies and/or different radio access technologies supported by the same access node. Gateway node 214 can be a standalone computing device, computing system, or network component, and can be accessible, for example, by a wired or wireless connection, or through an indirect connection such as through a computer network or communication network. For example, gateway node 214 can include a Serving Gateway (SGW) and/or Public Data Network Gateway (PGW), etc. One of ordinary skill in the art would recognize that gateway node 214 is not limited to any specific technology architecture, such as LTE, and can be used with any network architecture and/or protocol.

Gateway node 214 can comprise a processor and associated circuitry to execute or direct the execution of computer-readable instructions to obtain information. Gateway node 228 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Gateway node 214 can receive instructions and other input at a user interface.

Controller node 216 can be any network node configured to communicate information and/or control information over communication system 200. Controller node 216 can be configured to transmit control information associated with a handover procedure. Controller node 216 can be a standalone computing device, computing system, or network component, and can be accessible, for example, by a wired or wireless connection, or through an indirect connection such as through a computer network or communication network. For example, controller node 216 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that controller node 216 is not limited to any specific technology architecture, such as LTE, and can be used with any network architecture and/or protocol.

Controller node 216 can comprise a processor and associated circuitry to execute or direct the execution of computer-readable instructions to obtain information. Controller node 216 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers' network interfaces, applications, or some other type of software, including combinations thereof. Controller node 216 can receive instructions and other input at a user interface.

Access node 202 can be in communication with access node 204 through communication link 238 and access node 206 through communication link 232. Access node 202 can be in communication with gateway node 214 through communication link 242 and in communication with controller node 216 through communication link 240. Access node 204 can be in communication with access node 206 through communication link 230. Access node 204 can be in communication with gateway node 214 through communication link 236 and in communication with controller node 216 through communication link 234. Access node 206 can be in communication with gateway node 214 through communication link 228 and in communication with controller node 216 through communication link 226. Gateway node 214 can be in communication with controller node 216 through communication link 244 and with communication network 218 through communication link 246.

Communication links 226, 228, 230, 232, 234, 236, 238, 240, 242, 244, 246 can be wired or wireless and use various communication protocols such as Internet, IP, LAN, optical networking, HFC, telephony, T1, or some other communication format, including combinations, improvements, or variations thereof. Wireless communication links 226, 228, 230, 232, 234, 236, 238, 240, 242, 244, 246 can be a radio frequency, microwave, infrared, or other similar signal, and can use a suitable communication protocol, for example, GSM, CDMA, WiMAX, or LTE, or combinations thereof. Other wireless protocols can also be used. Communication links 226, 228, 230, 232, 234, 236, 238, 240, 242, 244, 246 can be a direct link or might include various equipment, intermediate components, systems, and networks.

Communication network 218 can be a wired and/or wireless communication network, and can comprise processing nodes, routers, gateways, and physical and/or wireless data links for carrying data among various network elements, including combinations thereof, and can include a LAN, a WAN, and an internetwork (including the Internet). Communication network 218 can be capable of carrying data, for example, to support voice, push-to-talk, broadcast video, and data communications by a wireless device, such as wireless devices 220, 222, 224. Wireless network protocols can comprise CDMA 1xRTT, GSM, UMTS, HSPA, EV-DO, EV-DO rev. A, 3GPP LTE, and WiMAX. Wired network protocols that may be utilized by communication network 218 comprise Ethernet, Fast Ethernet, Gigabit Ethernet, Local Talk (such as Carrier Sense Multiple Access with Collision Avoidance), Token Ring, FDDI, and ATM. Communication network 218 can also comprise additional base stations, controller nodes, telephony switches, internet routers, network gateways, computer systems, communication links, or some other type of communication equipment, and combinations thereof.

In operation, the queuing delay at schedulers 208, 210, 212 and/or congestion at packet buffer 248, 252 may occur due to, for example, data transmission errors (e.g., noise, interference, and/or fading) and/or packet loss. Referring to FIGS. 2A and 2B, increased HARQ/ARQ re-transmissions of TCP data packets may result in queuing delay at scheduler modules 208, 210, 212 due to the large amount of data "in flight" and increased signaling overhead and/or bearer data load on, for example, the DL portion of links 226, 228, 230, 232, 234, 236, 238, 240, 242, 244, 246. In addition, HARQ/ARQ re-transmissions can increase congestion at packet buffer 248 of access node 204 or cause bottle-neck at a PHY layer of system 200 due to a "back log" of data packets in buffer 248.

In an exemplary embodiment, an analysis of the data transmission errors, e.g., Block Error Rate (BLER), on the radio interface of, for example, access node 204 may be measured separately on both the UL and DL portions of links 226, 228, 230, 232, 234, 236, 238, 240, 242, 244, 246. The BLER may be tuned using Adaptive Modulation and Coding (AMC) to reach a "target BLER" value. For example, scheduler module 210, illustrated in FIG. 2B, can select an MCS based on Channel Quality Indicators (CQIs) reported by wireless devices 220, 222, 224 and adapt the MCS to tune the measured BLER so that the "target BLER" value is reached. Because, traditionally, the "target BLER" is a static, pre-configured operation that does not consider a status of, for example, residual HARQ/ARQ BLER or a PDCP/RLC buffer status, the MCS initially selected for transmission of the data packets must also be used for HARQ/ARQ re-transmission of the same data packets. Consequently, when, for example, an initial HARQ/ARQ transmission failure for data packets is lower than the "target BLER" value, the scheduler 210 assigns a higher MCS for subsequent transmissions than previously assigned, and vice versa.

In an exemplary embodiment, an aggregated queuing delay at scheduler modules 208, 210, 212 and a residual count of data packets left in, for example, the packet buffer 248, 252 of access node 204 when a discard timer expires are considered in choosing an MCS to tune the "target BLER." For example, data packets may be lost due damage and/or to data transmission errors (e.g., noise, interference, and/or fading). Damaged data packets are identified by HARQ/ARQ/RLC re-transmission NACKs an increase RTT of the data packets. For these data packets, a HARQ/ARQ/RLC re-transmission NACK rate may be calculated and used by, for example, scheduler 210 as an input to determine an initial "target BLER" value. Scheduler 210 may use the initial "target BLER" value to match modulation, coding, and other signal and/or protocol parameters on the radio interface, e.g., for selecting an MCS.

Packets lost due to data transmission errors (e.g., noise, interference, and/or fading) may be identified at, for example, packet buffer 248, 252 of access node 204. The packet buffer 248, 252 can include a discard packet timer that is started at, for example, access node 204 on receipt of a new data packet at packet buffer 248, 252. A value for the discard packet timer can be based on Quality of Service (QoS) and/or Channel Quality Indicators (CQIs) of applications running on wireless devices 220, 222, 224. When the discard packet timer is "stopped" or expires, a buffer delay (e.g., the period of time from receipt of the new data packet at the packet buffer 248, 252 until receipt at transmitter 254) associated with the new data packet and a residual number of packets in the buffer 248, 252 may be calculated. For example, the data packets remaining in packet buffer 248, 252 when the discard packet timer is "stopped" or expires can be discarded and periodically counted by, for example, a discard packet counter. Both the calculated buffer delay and the "counted" number of discarded data packets are used by active link controller 250 to determine a level, e.g., low, medium, high, of data transmission error (e.g., noise, interference, and/or fading) of system 200. If a level of data transmission error in system 200 is determined to be, for example, "high" by active link controller 250, scheduler 210 may implement a lower "target BLER" value setting. Scheduler 210 may use the lower "target BLER" value to match modulation, coding, and other signal and/or protocol parameters on the radio interface, e.g., for selecting an MCS.

Aggregating the queuing delay associated with a buffer delay and using a "counted" number of discarded packets to modify and/or adjust a "target BLER" value, e.g., queuing delay-based active link quality control, improves a perceived end-user performance in terms of system responsiveness without sacrificing throughput. In addition, delay-based active link quality control is capable of enhancing the stability of system 200 as a load on, for example, access node 204 increases and/or a heavy volume of service data increases.

Figure 3:
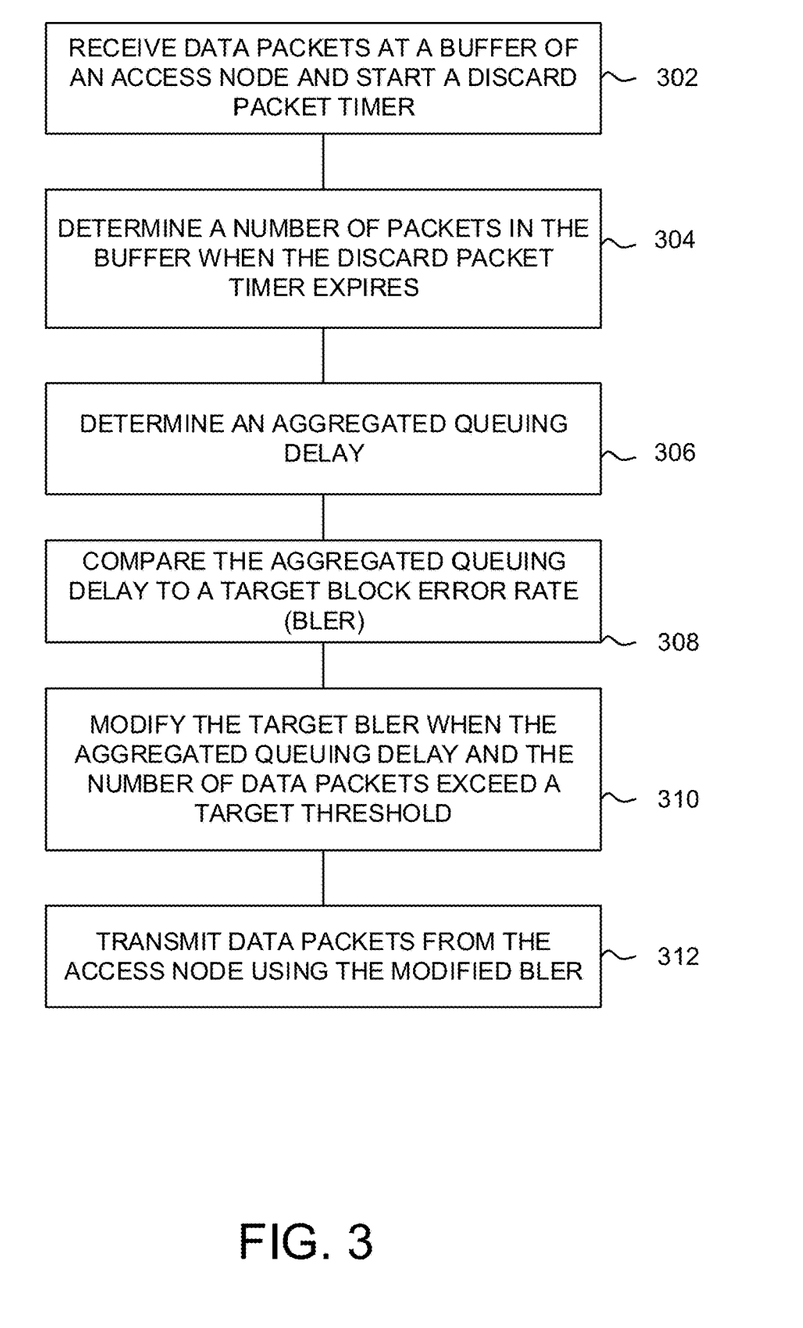
FIG. 3 illustrates an exemplary method for scheduling transmissions from an access node in a wireless communication network.

FIG. 3 illustrates an exemplary method for scheduling transmissions from an access node in a wireless communication network. The method will be discussed with reference to the exemplary communication system 200 illustrated in FIGS. 2A and 2B. However, the method can be implemented with any suitable communication system. In addition, although FIG. 3 depicts steps performed in a particular order for purposes of illustration and discussion, the method discussed herein is not limited to any particular order or arrangement. One skilled in the art, using the disclosures provided herein, will appreciate that various steps of the method can be omitted, rearranged, combined and/or adapted in various ways.

Referring to FIG. 3, at step 302, data packets are received at a packet buffer of an access node. For example, scheduler module 210, illustrated in FIG. 2B, can select a traditional MCS/AMC based on CQIs reported by wireless devices 220, 222, 224 and adapt the selected MCS/AMC to tune, for example, a static, preconfigured "target BLER" value. In an exemplary embodiment, new data packets are received at packet buffer 248, 252 of access node 204 and a discard packet timer, e.g., latency timer, is started. When the discard packet timer is "stopped" or expires, a buffer delay (e.g., the period of time from receipt of the new data packet at the packet buffer 248, 252 until receipt at transmitter 254) is calculated.

In an exemplary embodiment, a value for the discard packet timer can be based on QoS and/or CQIs of applications running on, for example, wireless devices 220, 222, 224. The QoS and/or CQIs can be used to differentiate priorities of service flows and to determine access node-specific parameters, such as link layer configuration, scheduling weights, and queue management. For example, QCI can comprise guaranteed bit rate (GBR) indications and non-guaranteed bit rate (non-GBR indications) and load on links 226, 228, 230, 232, 234, 236, 238, 240, 242, 244, 246 of system 200 can be determined for a particular traffic type indicator.

At step 304, a number of packets in the packet buffer when the discard packet timer expires is determined. For example, when the discard packet timer is "stopped" or expires, the residual data packets remaining in the packet buffer 248, 252, e.g., the data packets not transferred from the packet buffer 248, 252 to transmitter 254 while the discard packet timer is running, are discarded. A number of the discarded data packets can be periodically or inclemently counted by, for example, a discarded packet counter.

At step 306, an aggregated queuing delay may be determined. For example, both the calculated buffer delay determined at step 302 and the "counted" number of discarded data packets determined at step 304 are used by active link controller 250 to determine a level, e.g., low, medium, high, of data transmission error (e.g., noise, interference, and/or fading) and/or congestion of system 200 (e.g., aggregated queuing delay).

At step 308, the aggregated queuing delay may be compared to the target Block Error Rate (BLER). For example, if a level of data transmission error (e.g., noise, interference, and/or fading) in system 200 is determined to be, for example, "low" by active link controller 250, scheduler 210 may implement a higher "target BLER" value setting. Scheduler 210 may use the higher "target BLER" value to change, for example, a minimum HARQ/ARQ re-transmission count for packet buffer 248, 252 at an RLC sub-layer of the user-plane protocol stack.

At step 310, the "target BLER" value may be modified when the aggregated queuing delay and the number of data packets exceed a target threshold. For example, an initial "target BLER" value setting may be configured for packet buffer 248, 252 at an RLC sub-layer of the user-plane protocol stack. In an exemplary embodiment, when a number of residual data packets "counted" at packet buffer 248, 252 by the discard packet counter, as determined at step 304, exceed a count threshold and the aggregated queuing delay, determined at step 306, exceeds a delay threshold, scheduler 210 may dynamically modify the "target BLER" value setting at the RLC sub-layer of the user-plane protocol stack.

At step 312, the data packets are transmitted from the access node using the modified "target BLER" value. For example, scheduler node 210 can coordinate transmissions of wireless resources (e.g., the next available physical resource blocks, wireless spectrum, etc.) among connected wireless devices 220, 222, 224 using the modified "target BLER" value.

Figures 4A, 4B:
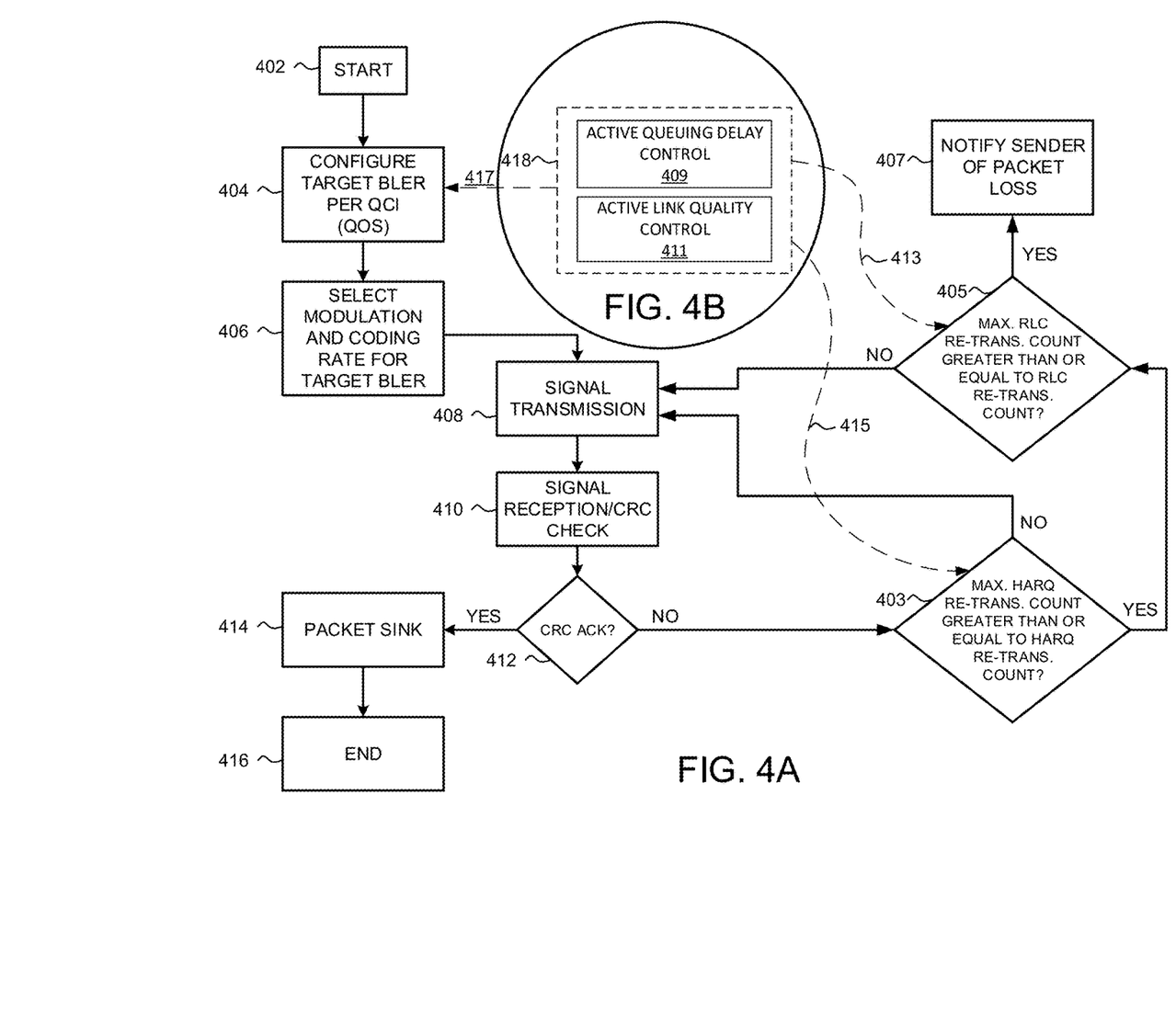
FIGS. 4A and 4B illustrates exemplary flow charts for scheduling transmissions from an access node in a wireless communication network.
Figure 4B:
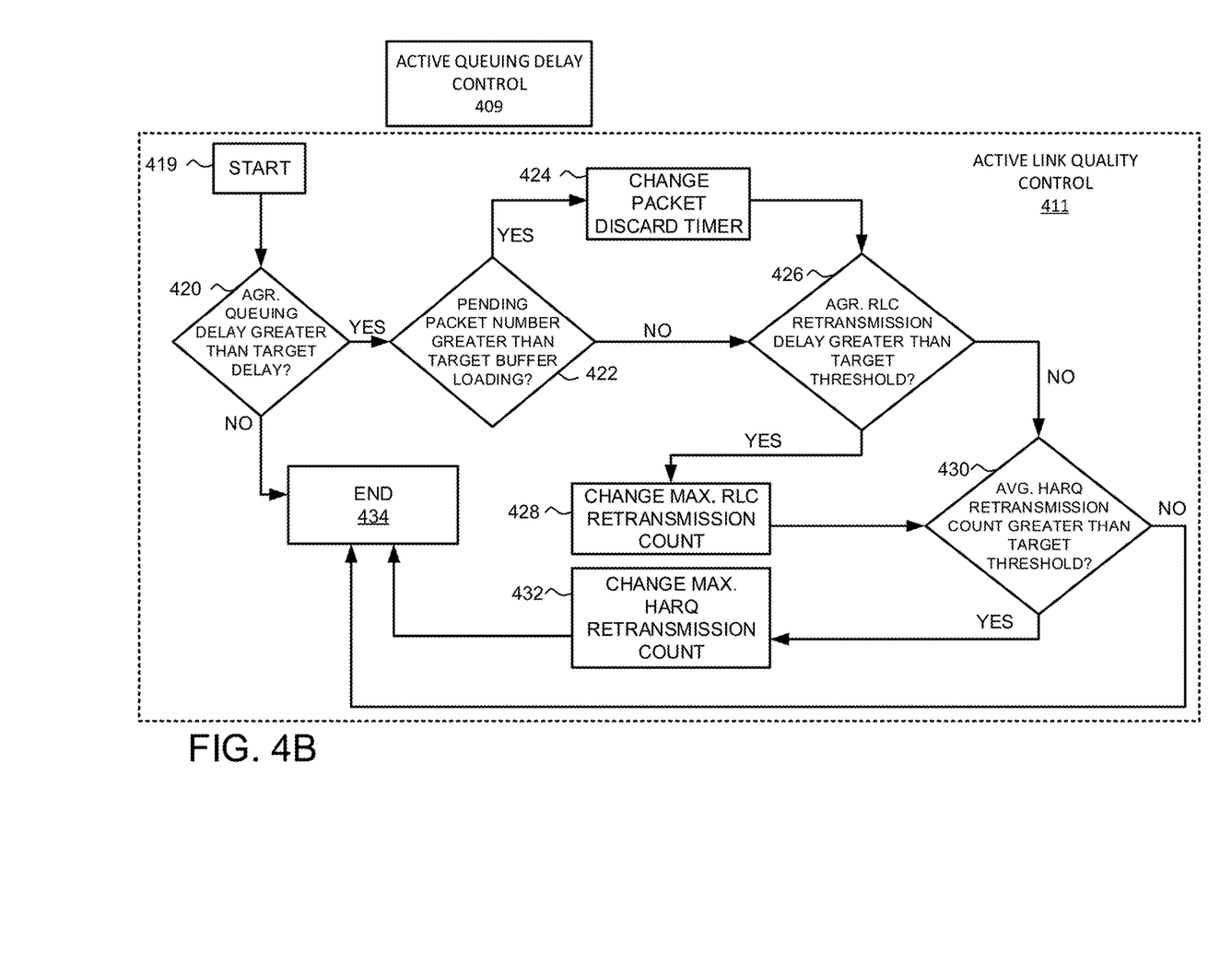

FIGS. 4A and 4B illustrate flow charts of an exemplary method for scheduling transmissions from an access node in a wireless communication network. The method will be discussed with reference to the exemplary communication system 200 illustrated in FIG. 2. However, the method can be implemented in the exemplary communication system 100 illustrated in FIG. 1 or with any other suitable communication system. In addition, although FIGS. 4A and 4B depict steps performed in a particular order for purposes of illustration and discussion, the methods discussed herein are not limited to any particular order or arrangement. One skilled in the art, using the disclosure provided herein, will appreciate that various steps of the methods can be omitted, rearranged, combined and/or adapted in various ways.

Referring to FIG. 4A, at steps 402, 404, and 406, an analysis of data transmission errors, e.g., Block Error Rate (BLER), on the radio interface of access node 204 may be measured separately on both the UL and DL portion of links 226, 228, 230, 232, 234, 236, 238, 240, 242, 244, 246. The BLER may be initially tuned using AMC to reach a traditional "target BLER" value, e.g., a static, pre-configured operation that does not consider a status of, for example, residual HARQ/ARQ BLER or a PDCP/RLC buffer status. For example, scheduler module 210, illustrated in FIG. 2B, can select an MCS/AMC based on Channel Quality Indicators (CQIs) reported by wireless devices 220, 222, 224 and adapt the MCS/AMC to tune the measured BLER so that the "target BLER" value is reached.

At step 408, increased HARQ/ARQ re-transmissions of data packets may result in queuing delay at, for example, scheduler module 210 due to a large amount of data "in flight" and increased signaling overhead and/or bearer data load on, for example, the DL portion of links 226, 228, 230, 232, 234, 236, 238, 240, 242, 244, 246. Consequently, a link quality control may be necessary. For example, at steps 408 and 410, due to data transmission errors (e.g., noise, interference, and/or fading) and/or damaged data packets, the data packets may be subject to HARQ/ARQ re-transmissions at the MAC sub-layer and/or the RLC layer of the user-plane protocol stack for error recovery. When HARQ/ARQ is working frequently for error recovery, a RTT for the data packets increases and affects throughput of system 200.

At step 412, a Cyclic Redundancy Check (CRC) may be used by system 200 for HARQ/ARQ as an error correction technique. If, at step 412, the CRC is acknowledged (CRC ACK), then the data packets may be synched at step 414 and the link quality control is completed at step 416.

If, at step 412, the CRC is not acknowledged (CRC NACK), then the data packets are not synched at step 414. For example, if, at step 403, the maximum HARQ/ARQ re-transmission NACKS (e.g., number of re-transmission NACKS) is less than the threshold HARQ/ARQ re-transmission count (e.g., threshold number of re-transmission NACKS) then the data packets are subject to HARQ/ARQ re-transmissions at the MAC sub-layer and/or the RLC layer of the user-plane protocol stack for error recovery at steps 408 and 410.

If, at step 403, the maximum HARQ/ARQ re-transmission NACKS are greater than or equal to the threshold HARQ/ARQ re-transmission count, but at step 405 the maximum RLC re-transmission count (e.g., number of re-transmission NACKS) is less than the threshold RLC re-transmission count (e.g., threshold number of re-transmission NACKS) then the data packets are subject to HARQ/ARQ re-transmissions at the MAC sub-layer and/or the RCL layer of the user-plane protocol stack for error recovery at steps 408 and 410.

If, at steps 403 and 405, the maximum HARQ/ARQ/RCL retransmission count is greater than or equal to a correlating threshold HARQ/ARQ/RLC re-transmission count, then the sender of the data packets is notified of packet loss at step 407. For example, in operation, the queuing delay at schedulers 208, 210, 212 and/or congestion at packet buffer 248, 252 occurs due to data transmission errors (e.g., noise, interference, and/or fading) and/or packet loss. Increased HARQ/ARQ re-transmissions of TCP data packets causes queuing delay at scheduler modules 208, 210, 212 due to the large amount of data "in flight" and increased signaling overhead and/or bearer data load on, for example, the DL portion of links 226, 228, 230, 232, 234, 236, 238, 240, 242, 244, 246. HARQ/ARQ re-transmissions increase congestion at packet buffer 248 and/or result in bottle-neck at a PHY layer of system 200 due to a "back log" of data packets in buffer 248. Access node 204 can measure the BLER separately on both the UL and DL portion of links 226, 228, 230, 232, 234, 236, 238, 240, 242, 244, 246 and tune the measured BLER using AMC to reach the "target BLER" value. Because, traditionally, the "target BLER" is a static, pre-configured operation that does not consider a status of residual HARQ/ARQ BLER or a PDCP/RLC buffer status, the initially selected MCS must be used for HARQ/ARQ re-transmission of the same data packets. Thus, the initial HARQ/ARQ re-transmission failure for data packets is lower than a "target BLER" value, the scheduler assigns a higher MCS for subsequent transmissions.

Referring to FIGS. 4A and 4B, at step 418, an active queuing delay control 409 and active link quality control 411 may be implemented. For example, access node 204 can measure the BLER separately on both the UL and DL portion of links 226, 228, 230, 232, 234, 236, 238, 240, 242, 244, 246 and tune the measured BLER using AMC to reach the "target BLER" value. The "target BLER" is a dynamic operation that considers a status of residual HARQ/ARQ BLER and/or a PDCP/RLC buffer status to dynamically select an MCS and tune the "target BLER" to be used for HARQ/ARQ re-transmission of the same data packets at steps 413, 415, and 417. For example, an analysis of the BLER on the radio interface of access node 204 may be measured separately on both the UL and DL portion of links 226, 228, 230, 232, 234, 236, 238, 240, 242, 244, 246. At step 420, increased HARQ/ARQ re-transmissions of data packets may result in queuing delay at, for example, scheduler module 210 and increased congestion at packet buffer 248, 252 of access node 204 and/or bottle-neck at a PHY layer of system 200 due to a "back log" of data packets in buffer 248. In an exemplary embodiment, packet buffer 248, 252 can include a discard packet timer that is started at, for example, access node 204 on receipt of a new data packet at packet buffer 248, 252. A value for the discard packet timer can be based on QoS and/or CQIs of applications running on wireless devices 220, 222, 224. When the discard packet timer is "stopped" or expires, a buffer delay (e.g., the period of time from receipt of the new data packet at the packet buffer 248, 252 until receipt at transmitter 254) associated with the new packet and a residual number of packets in the buffer 248, 252 may be calculated. For example, the data packets remaining in the packet buffer 248, 252 when the discard packet timer is "stopped" or expires can be discarded and periodically "counted" by, for example, a discard packet counter. Both the calculated buffer delay and the "counted" number of discarded data packets are used by active link controller 250 to determine a level, e.g., low, medium, high, of data transmission error (e.g., noise, interference, and/or fading) of system 200 (e.g., "aggregated queuing delay").

If the "aggregated queuing delay" is greater than a target queuing delay, then the number of pending data packets is compared to a target loading of packet buffer 248, 252 at step 422. For example, if the aggregated queuing delay exceeds the target queuing delay threshold and the number of queued data packets, for example, queued for upload from wireless devices 222, 224, 226 to system 200, exceeds the set loading level of packet buffer 248, 252 then a value for the discard packet timer is changed at step 424. If, however, the aggregated queuing delay exceeds the target queuing delay threshold at step 420, but the number of queued data packets does not exceed the set loading level of packet buffer 248, 252, then the value for the discard packet timer is not changed at step 424. At step 426, it may be determined whether an aggregated RLC re-transmission delay exceeds a target re-transmission threshold.

In an exemplary embodiment, if the aggregated RLC re-transmission delay does exceed the target re-transmission threshold, then a maximum RLC re-transmission count for the packet buffer 248, 252 is changed at step 428. Once the maximum RLC re-transmission count for packet buffer 248, 252 has been changed at step 428, it is determined whether the average HARQ/ARQ re-transmission count is greater than a target HARQ/ARQ re-transmission threshold at step 430. If the average HARQ/ARQ re-transmission count is not greater than the target HARQ/ARQ re-transmission threshold at step 43, then the queuing delay-based active link quality control test is completed at step 434. If, however, the HARQ/ARQ re-transmission count is greater than the target HARQ/ARQ re-transmission threshold at step 430, then a maximum HARQ/ARQ re-transmission count is changed at step 432 and the queuing delay-based active link quality control test is completed at step 434.

Access node 204 dynamically tunes the "target BLER" at step 404 based on the determined status of residual HARQ/ARQ BLER and/or a PDCP/RLC buffer status at steps 417, 418 and selects an MCS at step 406 to be used for HARQ/ARQ re-transmission of the same data packets. Signal transmission is checked at step 408 of FIG. 4A and a CRC check is performed at step 410. If the CRC check is acknowledged, e.g., CRC ACK, at step 412, then the data packets are synched at step 412 and the active link quality control test is completed at step 416.

Figure 5:
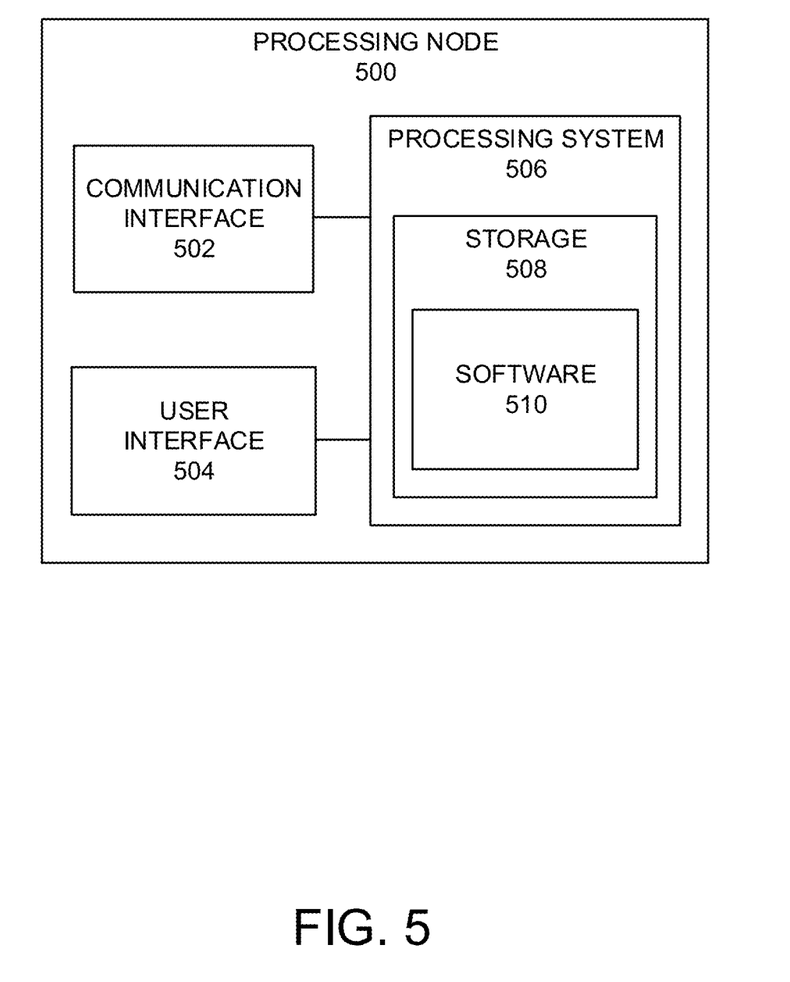
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication access node for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access nodes 104, 202, 204, 206, gateway node 214, and controller node 216. Processing node 500 can also be an adjunct or component of a network element, such as an element of access nodes 202, 204, 206, schedulers modules/nodes 106, 208, 210, 212, gateway node 214, and controller node 216. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for scheduling transmissions from an access node in a wireless communication network, the method comprising:
   receiving a plurality of data packets at a first packet buffer in a Radio Link Control (RLC) layer of the access node and starting a discard packet timer, wherein the discard packet timer is set at a first value;
   transmitting the plurality of data packets to at least one wireless device;
   receiving an Automatic Repeat Request (ARQ) from the at least one wireless device at a second packet buffer in the RLC layer of the access node;
   retransmitting at least one data packet of the plurality in response to the ARQ at the RLC layer, the MAC layer, or both;
   determining a number of data packets in the first and second packet buffers when the discard packet timer expires and a queuing delay associated with a scheduler;
   comparing the number of data packets with a count threshold;
   comparing the queuing delay to a delay threshold;
   modifying an initial target block error rate (BLER) at the RLC layer when the number of data packets in the first and second packet buffers exceeds the count threshold and the queuing delay exceeds the delay threshold; and
   transmitting the data packets from the access node using the modified initial target BLER.

2. The method of claim 1, wherein a value of the discard packet timer is based on a Quality of Service (QoS) and Channel Quality Indicator (CQI) of an application running on a wireless device.

3. The method of claim 1, wherein the queuing delay is based on a buffer delay associated with at least one data packet received at the first or second packet buffer.

4. The method of claim 3, wherein the queuing delay is further based on a number of discarded data packets.

5. The method of claim 4, wherein the data packets in the first and second packet buffers when the discard packet timer expires are periodically counted by a discard packet counter to determine the number of discarded data packets.

6. The method of claim 1, further comprising determining the initial target BLER based on an ARQ re-transmission NACK rate.

7. The method of claim 1, wherein the ARQ comprises a Hybrid Automatic Repeat Request (HARQ).

8. The method of claim 1, further comprising measuring BLER separately on both uplink and downlink at the access node.

9. A system for scheduling transmissions from an access node in a wireless communication network, the system comprising:
   a processing node configured to:
      receive a plurality of data packets at a first packet buffer in a Radio Link Control (RLC) layer of the access node and start a discard packet timer;
      transmit the plurality of data packets to at least one wireless device;
      receive an Automatic Repeat Request (ARQ) from the at least one wireless device at a second packet buffer in the RLC layer of the access node;
      retransmit at least one data packet of the plurality in response to the ARQ at the RLC layer, the MAC layer, or both;

determine a number of data packets in the first and second packet buffers when the discard packet timer expires and an associated queuing delay associated with a scheduler;

compare the number of data packets with a count threshold;

compare the queuing delay to a delay threshold;

modify an initial target block error rate (BLER) at the RLC layer when the number of data packets in the first and second packet buffers exceeds the count threshold and the queuing delay exceeds the delay threshold; and transmit the data packets from the access node using the modified initial target BLER.

10. The system of claim 9, wherein a value of the discard packet timer is based on a Quality of Service (QoS) and Channel Quality Indicator (CQI) of an application running on a wireless device.

11. The system of claim 9, wherein the queuing delay is based on a buffer delay associated with at least one data packet received at the first or second buffer.

12. The system of claim 11, wherein the queuing delay is further based on a number of discarded data packets.

13. The system of claim 12, wherein the data packets in the first and second packet buffers when the discard packet timer expires are periodically counted by a discard packet counter to determine the number of discarded data packets.

14. The system of claim 9, wherein the processing node is further configured to determine the initial target BLER based on an ARQ re-transmission NACK rate.

15. The system of claim 9, wherein the ARQ comprises a Hybrid Automatic Repeat Request (HARQ).

16. The system of claim 9, wherein the processing node is further configured to measure BLER separately on both uplink and downlink at the access node.

17. A method for implementing delay-based link quality control, the method comprising:

determining that an aggregated queuing delay at a first packet buffer and a second packet buffer in a Radio Link Control (RLC) layer of an access node is greater than a target delay threshold of the first and second buffers, wherein the first packet buffer is configured to receive a plurality of data packets on downlink to at least one wireless device and the second packet buffer is configured to receive an Automatic Repeat Request (ARQ) on uplink from the at least one wireless device;

starting a discard packet timer on receipt of a plurality of data packets at the first and second packet buffers of the access node;

comparing a number of queued data packets to a set loading level of the first and second packet buffers, and, when the number of queued data packets exceeds the set loading level, adjusting a value for the discard packet timer associated with the first and second packet buffers; and comparing the aggregated queuing delay to a target block error rate (BLER), and, when the number of queued data packets in the first and second packet buffers exceeds the set loading level of the first and second packet buffers, and the aggregated queuing delay exceeds the target queuing delay threshold, modifying the target BLER.

\* \* \* \* \*